United States Patent
Carlson et al.

(10) Patent No.: US 6,382,050 B1
(45) Date of Patent: May 7, 2002

(54) VIBRATION DAMPING DEVICE

(75) Inventors: Cora Carlson, Dittelbrunn; Bernd Peinemann; Jürgen Weth, both of Niederwerrn, all of (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/517,701

(22) Filed: Mar. 2, 2000

(30) Foreign Application Priority Data

Mar. 16, 1999 (DE) .......................... 199 11 560

(51) Int. Cl.$^7$ .............................................. F16F 15/10
(52) U.S. Cl. ...................... 74/574; 74/572; 132/106.1; 132/70.17; 464/24
(58) Field of Search ................ 74/572–574; 192/106.1, 192/70.17; 464/24, 62, 65, 82; 188/378; 417/233

(56) References Cited

U.S. PATENT DOCUMENTS

| | | | |
|---|---|---|---|
| 2,317,983 A | | 5/1943 | Fischer .......................... 74/604 |
| 3,681,939 A | * | 8/1972 | Timtner et al. ............ 74/572 X |
| 4,485,906 A | * | 12/1984 | Lutz et al. ................ 192/106.1 |
| 5,707,215 A | * | 1/1998 | Olney et al. ................. 417/233 |
| 5,751,202 A | | 5/1998 | Seino ........................ 335/296 |
| 5,934,882 A | * | 8/1999 | Olney et al. ................. 417/233 |
| 6,006,879 A | * | 12/1999 | Sudau ........................ 192/3.29 |
| 6,067,876 A | * | 5/2000 | Lohaus ........................ 74/574 |
| 6,109,134 A | * | 8/2000 | Sudau ........................ 74/574 |
| 6,119,840 A | * | 9/2000 | Dettmar ................... 192/70.17 |

FOREIGN PATENT DOCUMENTS

| | | | |
|---|---|---|---|
| DE | 40 068 | 7/1965 | |
| DE | 32 28 738 | 4/1983 | ............. F16D/3/80 |
| DE | 33 09 928 | 9/1984 | ............. F16D/3/80 |
| DE | 33 22 368 | 1/1985 | ............. F16D/3/80 |
| DE | 3624498 A1 * | 1/1988 | ................... 74/574 |
| DE | 38 39 436 | 9/1993 | ............. F16F/15/12 |
| DE | 44 26 317 | 2/1995 | ............. F16F/15/30 |
| DE | 195 38 722 | 4/1997 | ............. F16F/15/12 |
| DE | 195 44 832 | 1/1998 | ............. F16D/3/68 |
| DE | 198 14 502 | 11/1998 | ........... F16D/13/60 |

* cited by examiner

Primary Examiner—Vinh T. Luong
(74) Attorney, Agent, or Firm—Cohen, Pontani, Lieberman & Pavane

(57) ABSTRACT

A vibration damping device for a drive system of a motor vehicle includes a base body arranged for rotating about an axis of rotation and a deflection mass arrangement arranged in said base body and having at least one deflection mass and a deflection path associated with the at least one deflection mass and along which the deflection mass is movable during rotation of the base body about the axis of rotation. The deflection path has a vertex area at a position furthest from the axis of rotation and deflection areas on both sides of the vertex area extending from the vertex area to ends areas. The deflection areas have a decreasing distance from the axis of rotation (A) proceeding from the vertex area toward their end areas. A braking arrangement acts in the end areas of the deflection areas for gradually slowing the approach of the at least one deflection mass to a respective end area of the deflection path.

7 Claims, 9 Drawing Sheets

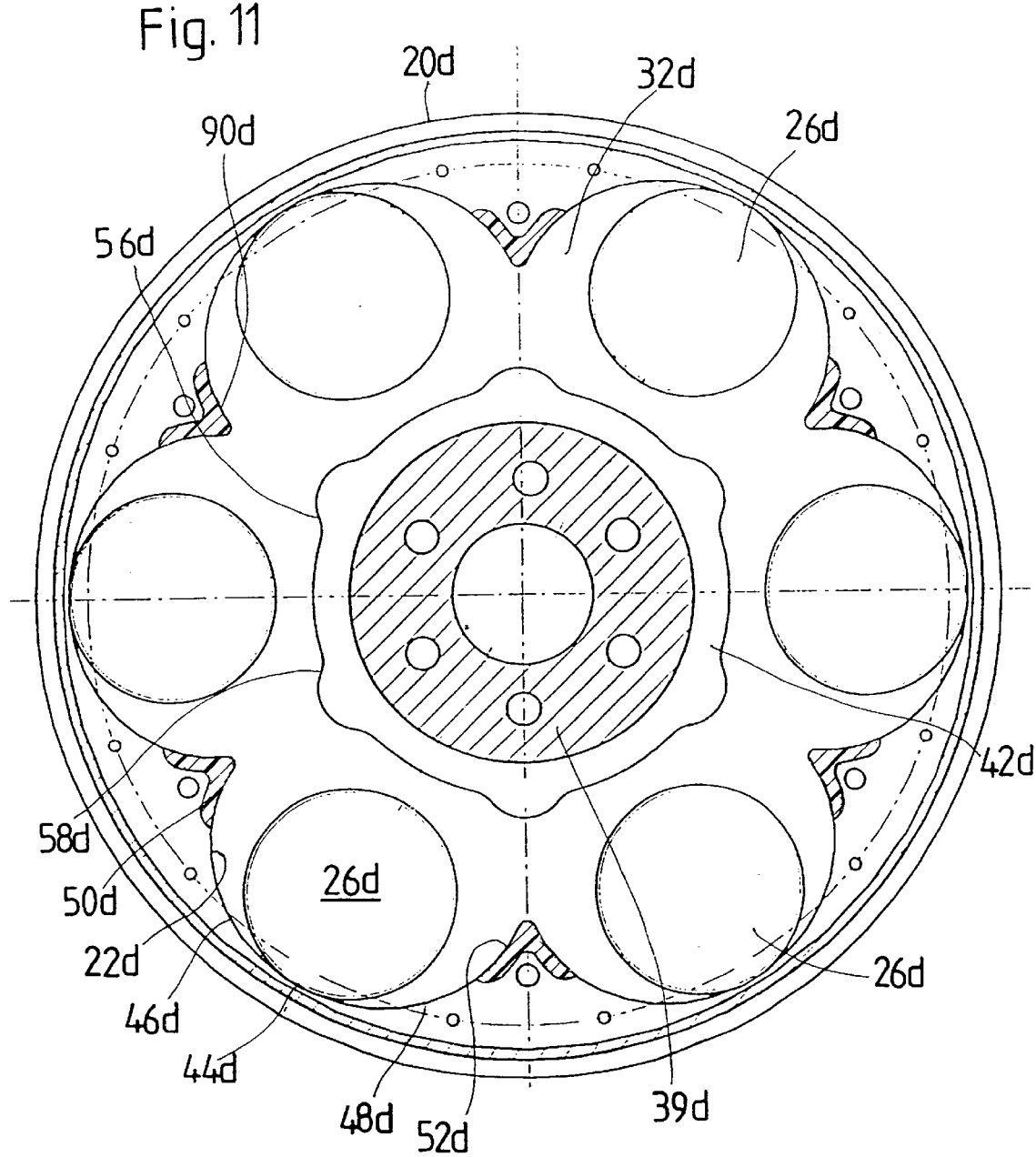

VIBRATION DAMPING DEVICE

BACKGROUND OF THE INVENTION

1. Field of the Invention

The present invention is directed to a vibration damping device including a base body rotatable about an axis of rotation and a deflection mass arrangement arranged in the base body, the deflection mass arrangement having at least one deflection mass and a deflection path associated with the at least one deflection mass and along which the deflection mass is movable during rotation of the base body about the axis of rotation, wherein the deflection path has a vertex area and deflection areas on both sides of the vertex area the deflection areas have a decreasing distance from the axis of rotation proceeding from the vertex area toward their end areas.

2. Description of the Related Art

A vibration damping device is disclosed in DE 44 26 317 A1 having a base body with a deflection mass arrangement including deflection masses arranged in deflection paths having vertex areas and deflection area. This reference further discloses disklike deflection masses distributed about the axis of rotation of the base body in a plurality of receiving chambers curving around the axis of rotation. The deflection masses roll along an outer circumferential wall of the receiving chambers. This type of damping device is referred to as a speed-adaptive damper, wherein the deflection masses are positioned in the vertex area of the respective deflection path at the greatest distance radially from the axis of rotation when the base body is rotating at a uniform rate. Irregularities in the rotational movement cause a deflection of the deflection masses out of the vertex areas. As the deflection masses move from the vertex area, the curvature of the deflection paths forces the deflection masses to approach the axis of rotation and, thereby displace centrifugal potential of the deflection masses. This movement of the deflection masses damps torsional vibrations, especially periodic torsional vibrations. The deflection arrangement may be designed with a particular curvature of the deflection paths and a particular weight of the deflection masses to adapt the deflection arrangement, for example, to higher harmonic orders of the vibrational excitation generated by an internal combustion engine.

When the occurring excitations lead to relatively large deflections of the individual deflection masses, the latter reach as far as the respective end areas of the deflection paths. Since the deflection paths have only a limited circumferential extension, the deflection masses may knock against the end areas of the deflection paths when deflection amplitudes are too great. This abrupt collision may manifest itself by rattling noises or in further vibrational excitation. This impairs driving comfort as well as the behavior for minimizing vibrational excitations generated in an existing drive system.

SUMMARY OF THE INVENTION

It is the object of the present invention to provide a vibration damping device in which the damping behavior is improved, especially during large vibrational excitations.

According to an embodiment of the present invention, the object is met by a vibration damping device comprising a base body operatively arranged for rotating about an axis of rotation and a deflection mass arrangement arranged in the base body. The deflection mass arrangement has at least one deflection mass and a deflection path associated with the at least one deflection mass so that the at least one deflection mass is movable along the deflection mass during rotation of the base body about the axis of rotation. The deflection path has a vertex area and deflection areas on both sides of the vertex area. The deflection areas have end areas and are arranged so that a distance of the deflection area from the axis of rotation decreases as the deflection area proceeds from the vertex area toward the end areas.

The vibration damping device according to the present invention also comprises a braking arrangement which acts in the end areas of the deflection areas by gradually slowing the movement of the at least one deflection mass when the at least one deflection mass approaches or reaches a respective end area of the deflection path.

The vibration damping device according to the invention prevents the knocking of a deflection mass and the generation of a vibrational excitation by braking the deflection masses through a gradual slowing down of movement.

The braking arrangement may comprise a stop device which is displaceable at least within an area of displacement by the at least one deflection mass against the action of a force. An additional damping moment resulting from the displacement of the stop device against the influence of force, which displacement becomes necessary in a compulsory manner, is introduced in this way.

The stop device may comprise a stop area associated with each of the two end areas of a deflection path.

In this case, it is advantageous when the stop device is movable in different directions by at least one deflection mass when the at least one deflection mass strikes the different stop areas. Accordingly, the stop device may be moved back and forth alternately by the deflection mass or deflection masses depending on the movement direction.

This movement of the stop device may optionally be generated, for example, against the action of a friction force. Moreover, the movement may occur against the action of a restoring spring arrangement.

An embodiment having a simple construction may be achieved when the stop device is elastically deformable at its stop areas. The stop areas may, for example, comprise stop webs proceeding from a main body.

In another embodiment, which may be combined with the possible embodiments discussed above, the braking arrangement may comprise a portion having increased elasticity in the end areas of the deflection areas. In addition, or alternatively, the end areas of the deflection area may comprise a portion with increased rolling or sliding movement resistance. The undesirable colliding of a deflection body in the end areas of its movement may also be prevented by arranging an axially projecting guide pin on the at least one deflection body which moves along at least one guide path during the movement of the at least one deflection body along the deflection path. Furthermore, the guide path is elastically deformable at least in its respective end portions in which the at least one guide pin is located when the at least one deflection mass is positioned in the end areas of the deflection area. Furthermore, the associated guide pin may also be elastically deformable.

As discussed above, the problem of the prior art in which the deflection masses collide at structural component groups terminating the movement path of the deflection masses occurs when there is a relatively strong vibrational excitation which leads to correspondingly large deflections. Accordingly, a further possibility provided by the present invention for improving the damping behavior by preventing a collision at path ends is directed toward enlarging the movement area of the individual deflection masses while retaining the same constructional volume. Therefore, a further embodiment of the present invention includes a vibration damping device for a drive system of a motor vehicle comprising a deflection mass arrangement arranged in a base body which is rotatable about an axis of rotation. The deflection mass arrangement has at least two deflection masses and a deflection path which is associated with each of the deflection masses and along which the deflection masses can move during rotation of the base body about the axis of rotation. The deflection path has a vertex area and deflection areas on both sides of the vertex area. The deflection areas have end areas and are arranged so that a distance of the deflection area from the axis of rotation decreases as the deflection area proceeds from the vertex area toward the end areas. The at least two deflection paths adjoin one another in respective adjacent end areas and an overlapping volume is formed in the area of the adjoining end. Each of the deflection masses associated with the two adjoining deflection paths projects into the overlapping volume when it is positioned in the respective end area of the deflection path associated with it.

The above arrangement ensures that there is a volume area in which different deflection masses may engage depending on the vibrational deflection. However, since each of the deflection masses move in phase, i.e., in the same circumferential direction, the state in which both deflection masses of directly adjacent deflection paths attempt to enter simultaneously into the overlapping volume area does not occur. Accordingly, the available volume may be used in an overlapping manner by a plurality of deflection masses, thereby allowing the movement paths to be lengthened. The increased length of the movement path may be used to reduce the risk of striking against end areas of the deflection path or increase the quantity of oscillating masses.

For example, two directly adjacent deflection paths may essentially run into one another in a wedge-shaped manner in their end areas which adjoin one another.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 11 is an axial view of yet another embodiment of a vibration damping device aaccording to the present invention.

DETAILED DESCRIPTION OF THE PRESENTLY PREFERRED EMBODIMENTS

Figure 1:
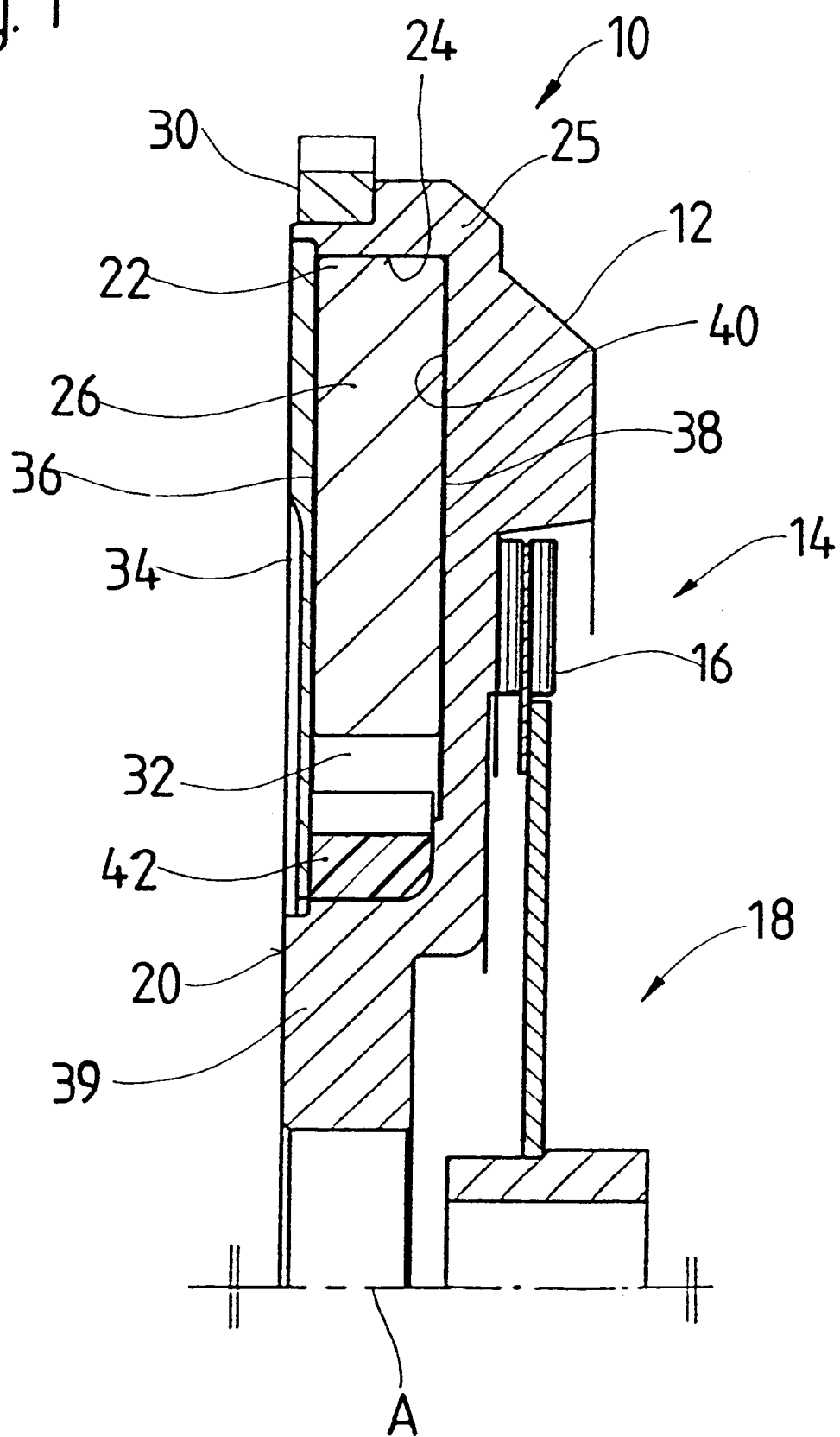
FIG. 1 is a partial longitudinal sectional view showing a vibration damping device according to an embodiment of the invention.
Figure 2:
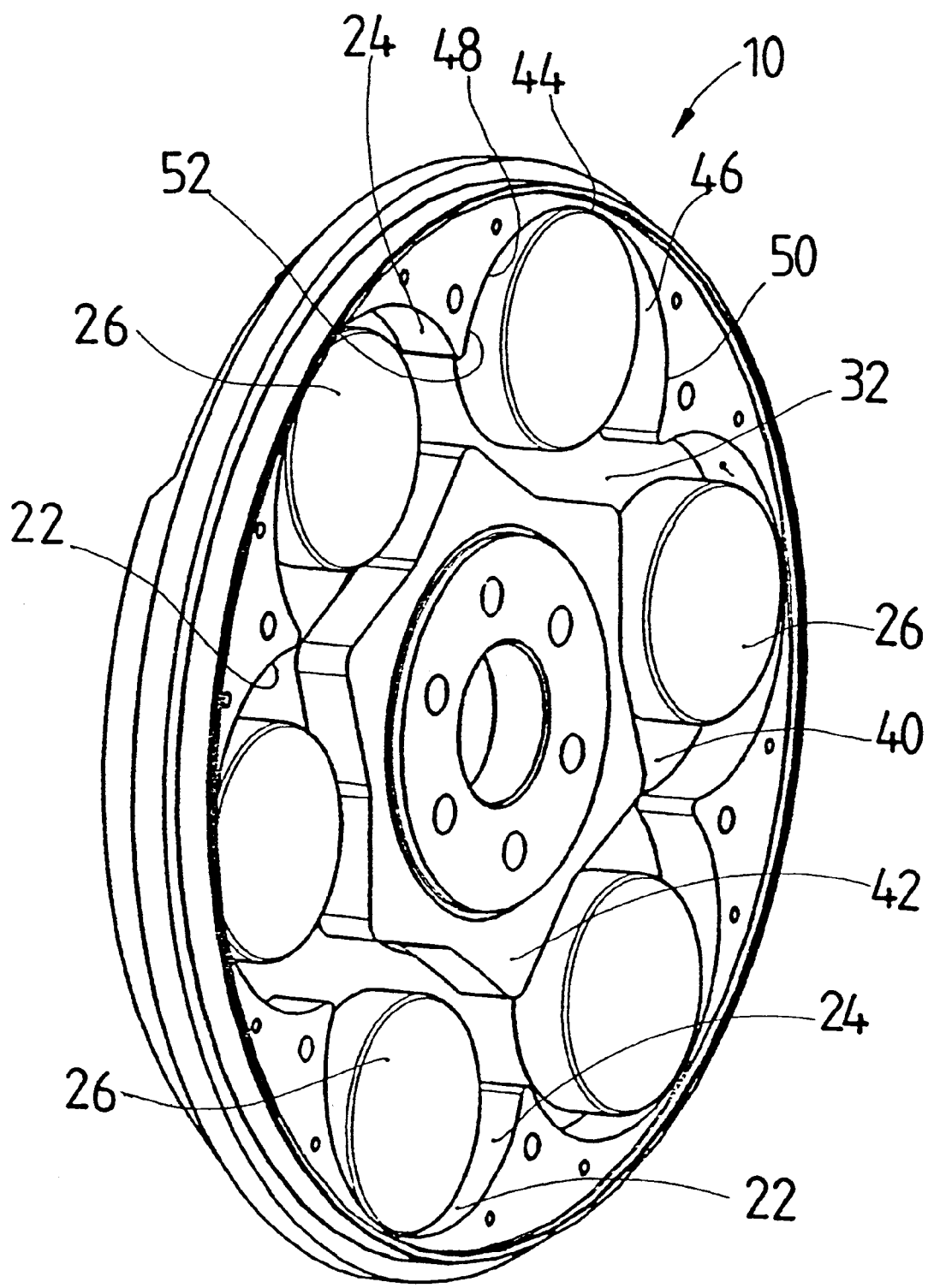
FIG. 2 is a perspective view of the vibration damping device in FIG. 1 with a cover plate removed.
Figure 3:
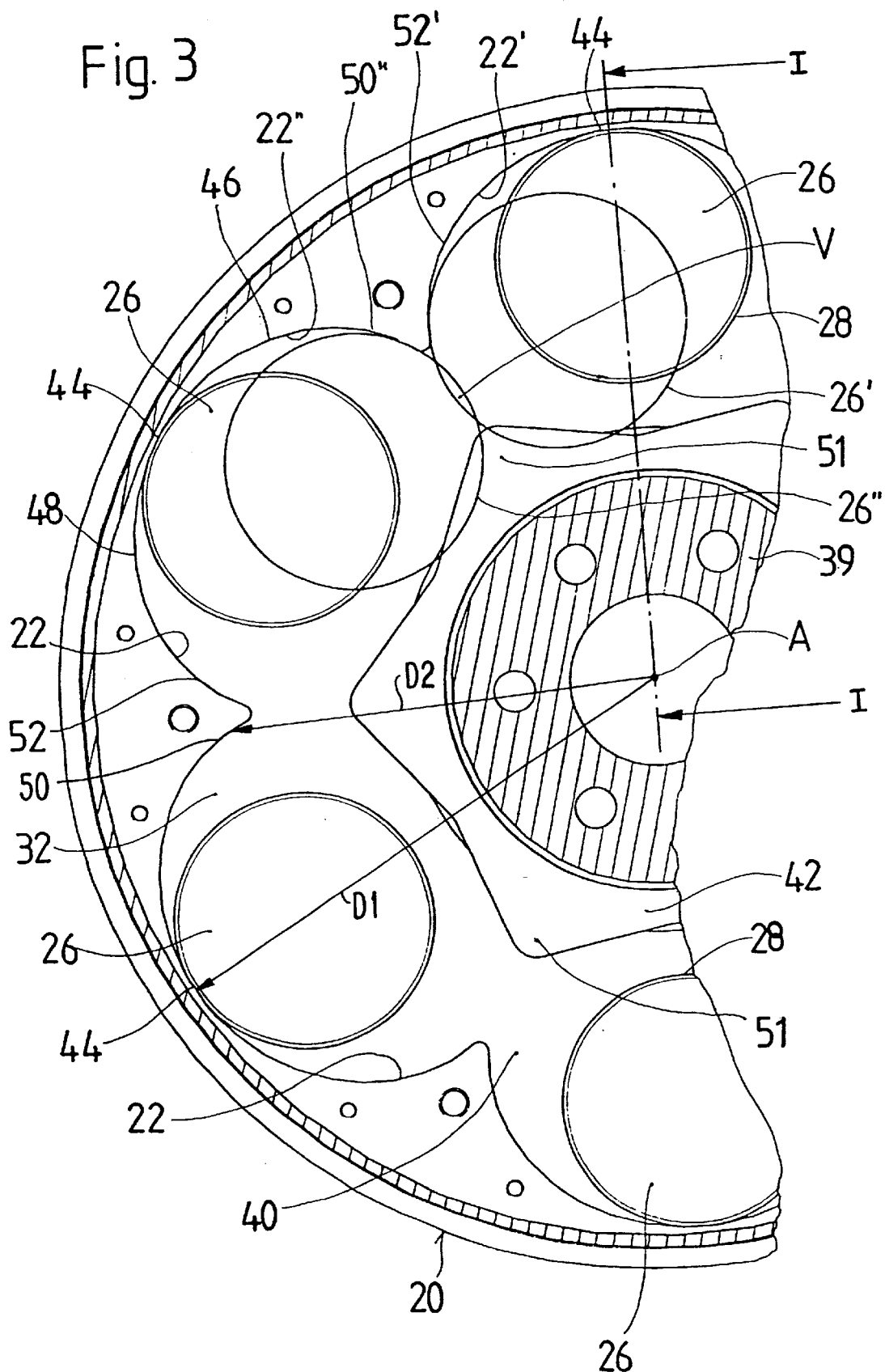
FIG. 3 is an axial view of the vibration damping device of FIGS. 1 and 2.

A vibration damper 10 according to an embodiment of the present invention is shown in FIGS. 1 to 3. The vibration damper 10 is provided for use with a flywheel 12 of a motor vehicle clutch 14 which is indicated only schematically. This flywheel 12 is engagable with friction facings 16 of a clutch disk 18 so that a driving force is conducted via a drivetrain from a driving unit coupled with the flywheel 12 to driving wheels when the clutch 14 is engaged. It is noted that the vibration damper 10 as shown here in connection with the flywheel 12 at a drivetrain of a vehicle, may also be used in a wide variety of other rotating systems or may be used in other spatial areas of such a flywheel or clutch arrangement. For example, the vibration damper may also be positioned in the clutch housing or in a pressure plate of a clutch.

The flywheel 12 forms a base body 20 for the vibration damper 10. As shown in FIGS. 2 and 3, a depression 32 is arranged in the base body 20. The radial outer side of the depression 32 with respect to the axis of rotation A is defined by a plurality of successive curved path portions 22 with inward-facing path surfaces 24 at a circumferential wall area 25 (see FIG. 1) of the base body 20. Each of these paths 22, referred to hereinafter as deflection paths 22, has an epicycloidal shape so that the centers of gravity of deflection masses 26 move on an essentially epicycloidal path. Each deflection path 22 has a vertex area 44 at a point on the deflection path 22 which is furthest from the axis of rotation A and deflection areas 46, 48 on both sides of the vertex area 44. The deflection areas 46, 48 have respective end areas 50, 52 and are arranged so that a distance of the deflection path 22 from the axis of rotation A decreases as the deflection path 22 proceeds from the vertex area 44 toward the end areas 50, 52. For example, FIG. 3 shows that a distance D1 from the vertex area 44 to the axis of rotation A is greater than a distance D2 from the end area 50 to the axis of rotation. The deflection paths 22 respectively support the deflection masses 26 at the radial outer side of the deflection mass 26. Both the deflection masses 26 and the deflection paths 22 are cylindrically shaped. Furthermore, the deflection masses 26 are provided with beveled edges 28 (see FIG. 3) to prevent jamming.

A radial outer side of the flywheel includes a starter ring gear 30 fitted to the flywheel 12. The depression 32 which is formed in the flywheel 12 or base body 20 and in which the individual deflection masses 26 are received has an open side that is closed by a cover plate 34. Each deflection mass 26 has two side surfaces 36, 38 on opposing axial sides. The two side surfaces 36, 38 are arranged between a base surface 40 on the closed side of the depression 32 and the cover plate 34 on the open side of the depression 32. The base body 20 comprises a central hub-like shoulder 39 on which a stop ring 42 having an approximately star-shaped configuration is positioned. The hub-like shoulder 39 surrounds the axis of rotation A and is not necessarily formed in one piece with the base body 20. The function and specific construction of the stop ring 42 will be described in more detail below.

The operation of a vibration damper 10 is generally known and will therefore be described only briefly in the following. When the flywheel 12 is driven in rotation about the axis of rotation A by an internal combustion engine, each of the plural deflection masses 26 is pulled into the vertex area 44 of the individual deflection paths 22 by the urgency of the prevailing centrifugal forces. When the system rotates at constant speed, the deflection masses 26 remain positioned in the area of the vertex 44. However, a rotational irregularity such, for example, as caused by the ignition thrusts occurring periodically in the internal combustion engine excite vibrations in the drivetrain so that the deflection masses 22 are deflected in a more or less periodic manner out of their rest position located in the area of the vertex 44 into the deflection areas 46, 48 located at both sides of the vertex 44. The periodic movement of the deflection masses 26 builds up a vibration which opposes the excitation vibration, thereby damping the rotational irregularities occurring in the drivetrain. By defining predetermined path curvatures or masses and shapes of the deflection masses 26, the vibration damper 10 may be adapted to specific excitation frequencies such, for example, as the higher harmonic orders of the excitation vibrations of the internal combustion engine. In a preferred embodiment, the deflection paths 22 are not circular, which ultimately leads to an oscillation of a harmonic oscillator. Rather, as was described above, the deflection paths are preferably constructed in an epicycloidal shape. Harmonic oscillators have the disadvantage that the natural frequency of the oscillators is independent from the amplitude only for very small deflection angles proceeding from the vertex areas 44. However, when the deflections exceed these small deflection angles, the independence is lost so that the natural frequency of the oscillators also changes. When the natural frequency of the oscillators shifts, the system no longer damps the determined frequency. Epicycloids have a sharper curvature in the deflection areas 46, 48 and their end areas 50, 52 which makes the oscillation amplitudes and the natural frequency of the oscillator independent from one another over the entire path course, i.e., over the entire deflection angle range. Therefore, when an epicycloidal path is used, the vibration frequency of the oscillator also remains constant for large amplitudes, as a result of which a determined excitation frequency may still be damped even in case of large vibrational excitations.

In the upper area of FIG. 3, two adjacent deflection masses 26' and 26" are shown by single lines and are located in end areas 50" and 52' of the directly adjacent deflection paths 22', 22". These two end areas 50" and 52' meet in a wedge-shaped formation so that the deflection masses 26', 26" overlap theoretically in an overlapping volume area V (in the position of the two deflection masses 26', 26" shown in the drawing). The word "theoretically" is used because such a state does not occur in practice. As stated above, all deflection masses 26 oscillate in the same phase, i.e., all deflection masses are positioned respectively at the associated end area 52 or are positioned at the associated end area 50 at the same point in time. That is, directly adjacent deflection masses 26 will not be located in the adjoining end areas 50, 52 of their two deflection paths 22. However, since this state does not occur, the overlapping volume area V may be used to enlarge the entire path to be traversed by every deflection mass 26 by that area in which the individual deflection masses 26' and 26" engage in the volume area V. As a result, an effective vibration damping or vibration elimination provided by the epicycloidal path shaping may be utilized to the greatest possible extent so that the damper works more effectively. A plurality of deflection masses 26 may be provided while retaining the same path length.

The stop ring 42 ensures that the deflection masses 26 cannot exit their respective deflection paths 22 when the respective end areas 50, 52 are reached. When one of the end areas 50, 52 is reaches, the individual deflection masses 26 are held or stopped at the end areas of the paths. A first embodiment of the stop ring 42 for preventing the deflection mass 26 from exiting its respective stop path, for example, includes using the stop ring 42 as in FIGS. 1–3 as an abutment. However, in the case of deflection paths 22 which are lengthened in this way, the abutment of the deflection masses 26 on the stop rings has been shown to produce an unwanted knocking noise or an unwanted vibrational excitation. Therefore, the following describes an embodiment of the stop ring 42 for gradually braking the deflection masses when the individual deflection masses 26 approach the end areas 50, 52 or are positioned in these areas. A further vibration damping function or vibration canceling function is integrated solely through the gradual braking and an abrupt shock is prevented. It is noted that the configurations described in the following for achieving this function need not necessarily be realized by shaping the deflection paths 22 in such a way that the deflection masses 26 can enter the overlapping volume area V, as shown in FIG. 3.

Figure 4:
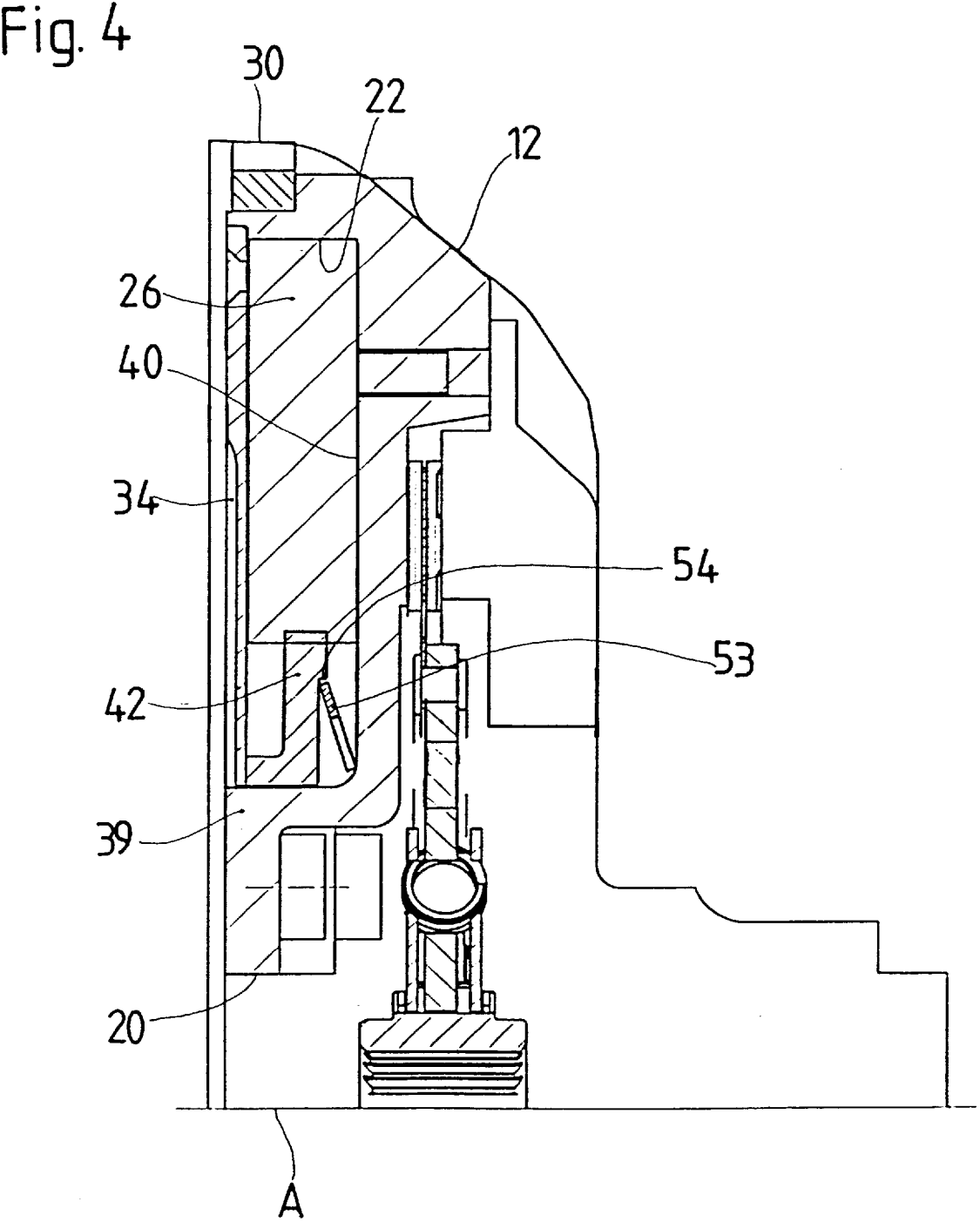
FIG. 4 is a partial longitudinal sectional view of the embodiment shown in FIG. 1 with a braking arrangement for the deflection masses.

Referring to FIG. 3, the stop ring 42 limits the possibility of the deflection masses 26 moving very far inward radially. However, the stop ring 42 would limit a movement of the individual deflection masses 26 relatively soon with its star-shaped outer contour, especially in view of the fact that each of the wedges or tips 51 of this star-shaped contour is formed for cooperation with two directly adjacent deflection masses. To avoid this, FIGS. 4 and 5 describe a configuration of the stop ring 42 that ensures that the two deflection masses 26' and 26" are moveable as far as possible to their respective path ends. In particular, FIG. 4 shows that the stop ring 42 is rotatably supported on the hub area 39 of the base body 20. The stop ring is also pretensioned in the axial direction against the cover plate 34 by a pretensioning element such, for example, as a dish spring 53. The radial outer side of the dish spring 53 is supported at a shoulder 54 of the stop ring 42 and is centered radially in this manner. The stop ring 42 is accordingly rotatable with respect to the base body 20 against the frictional force generated by the dish spring 53. Friction points are generated by support of the dish spring 53 at the base surface 40 of the base body 20, by support of the dish spring 53 at the stop ring 42, and by support of the stop ring 42 at the cover plate 34.

Figure 5:
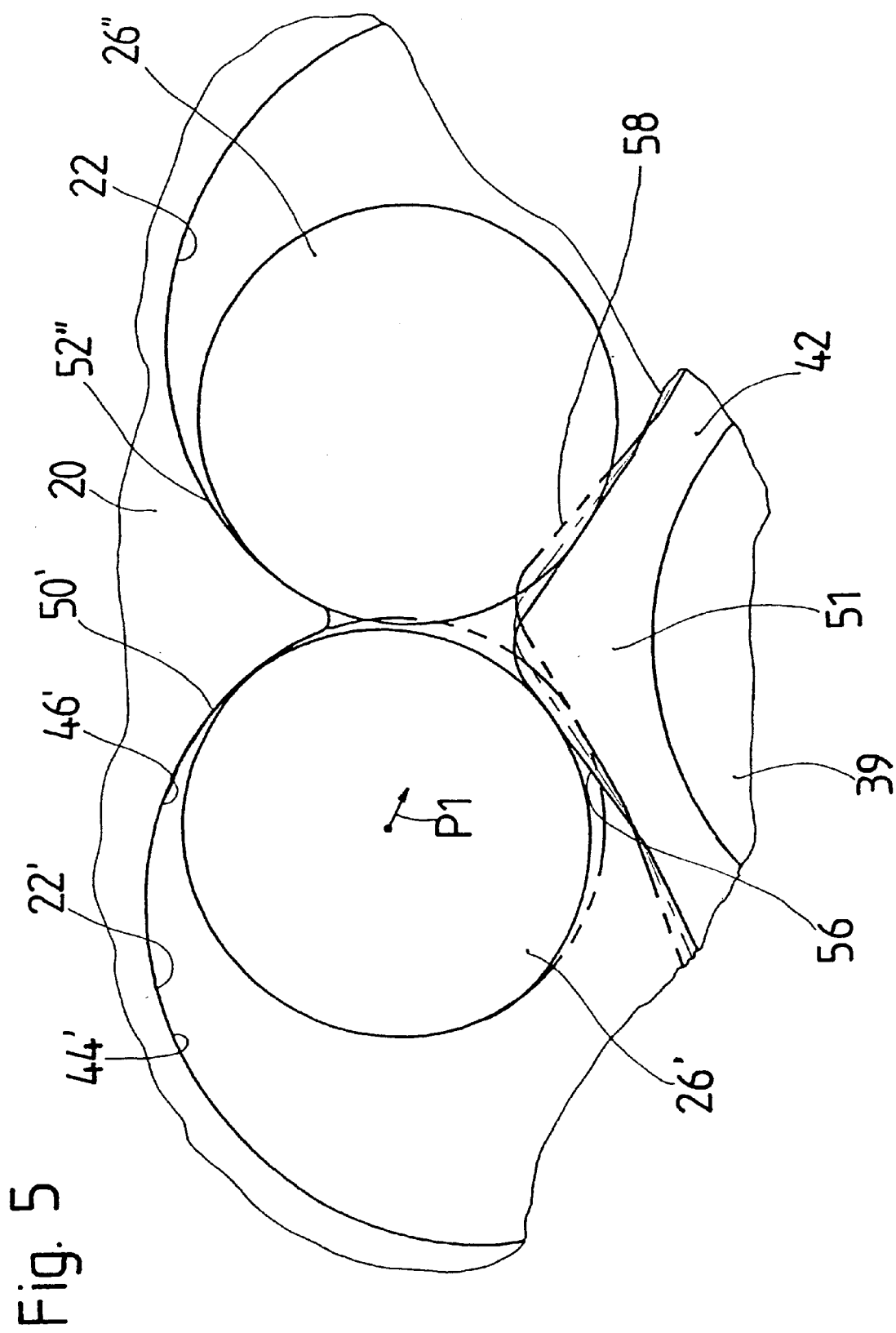
FIG. 5 is an axial view showing two adjacent deflection masses and the functional principle of the braking arrangement of FIG. 4.

The principle of operation is described in the following with reference to FIG. 5. The deflection mass 26' has moved proceeding from the vertex area 44' of the deflection path 22' associated with the deflection mass 26' into the end area 50' of the deflection area 46'. The direction of movement is indicated by an arrow P1. The deflection mass 26' then encounters a stop area 56 on the stop ring 42 located in the position indicated by the solid line. Starting from the time that the deflection mass 26' contacts the stop area 56, continued movement of the deflection mass 26' displaces the stop ring 42 until the stop ring reaches an end of its movement path. The position of the stop ring 42 and the deflection mass 26' at this end position is indicated in the Figure in bold dashed lines. Accordingly, a center position of the stop ring 42 is indicated by a thin dashed line. During this transition, the movement of the deflection mass 26' is gradually braked by the generated friction mentioned above until the deflection mass 26' and the stop ring 42 come to a stop in the end position. The end position is essentially defined by a position of the stop area 56 or a tangent line at the deflection path 22' in which the deflection mass 26' is prevented from further movement. Ideally, however, the end position is not fully reached. Instead, the movement energy of the deflection mass 26' has already been completely dissipated in friction energy before this fully deflected position has been reached.

As the oscillation continues, the deflection mass 26' and all of the other deflection masses 26 move back in a direction opposite to direction P1 and approach the opposite path end 52 (52" for mass 26"). Accordingly, deflection mass 26" now approaches the area of the tip or wedge 51 which was recently in contact with deflection mass 26'. When the deflection mass 26" approaches or reaches the end area 52', it interacts with a stop area 58 of the stop ring 42. Accordingly, each tip or wedge 51 of the stop ring 42 forms two stop areas 56, 58 for two different deflection masses 26', 26". In a corresponding manner, a pair of directly adjacent stop areas 56, 58 on directly adjacent tips or wedges 51 are provided at the stop ring 42 for each of the deflection masses 26.

When the deflection mass 26" encounters the stop area 58, the stop ring 42 is pushed back again, namely, through the neutral position indicated by the thin dashed line, until it reaches a position corresponding to the position indicated by a solid line. This end position is achieved only when the vibration energy is sufficiently great that the respective deflection masses 26 penetrate up to the outermost end of their movement paths.

It will be seen from the preceding description that the stop ring 42 is accordingly rotated back and forth alternately at the frequency of the back-and-forth movement of the deflection masses 26 by the respective stopping of the deflection masses 26 at the stop areas 56 or 58. The movement energy of the stop ring 42 is converted into friction energy during every rotational movement by the pretensioning of the spring 53, thereby gradually braking the individual deflection masses 26. An adjustment of the friction ratios such, for example, as by coating the friction facings may be effected for adapting the friction ratio to the damping behavior especially in the end area of the respective oscillation movement.

Figure 6:
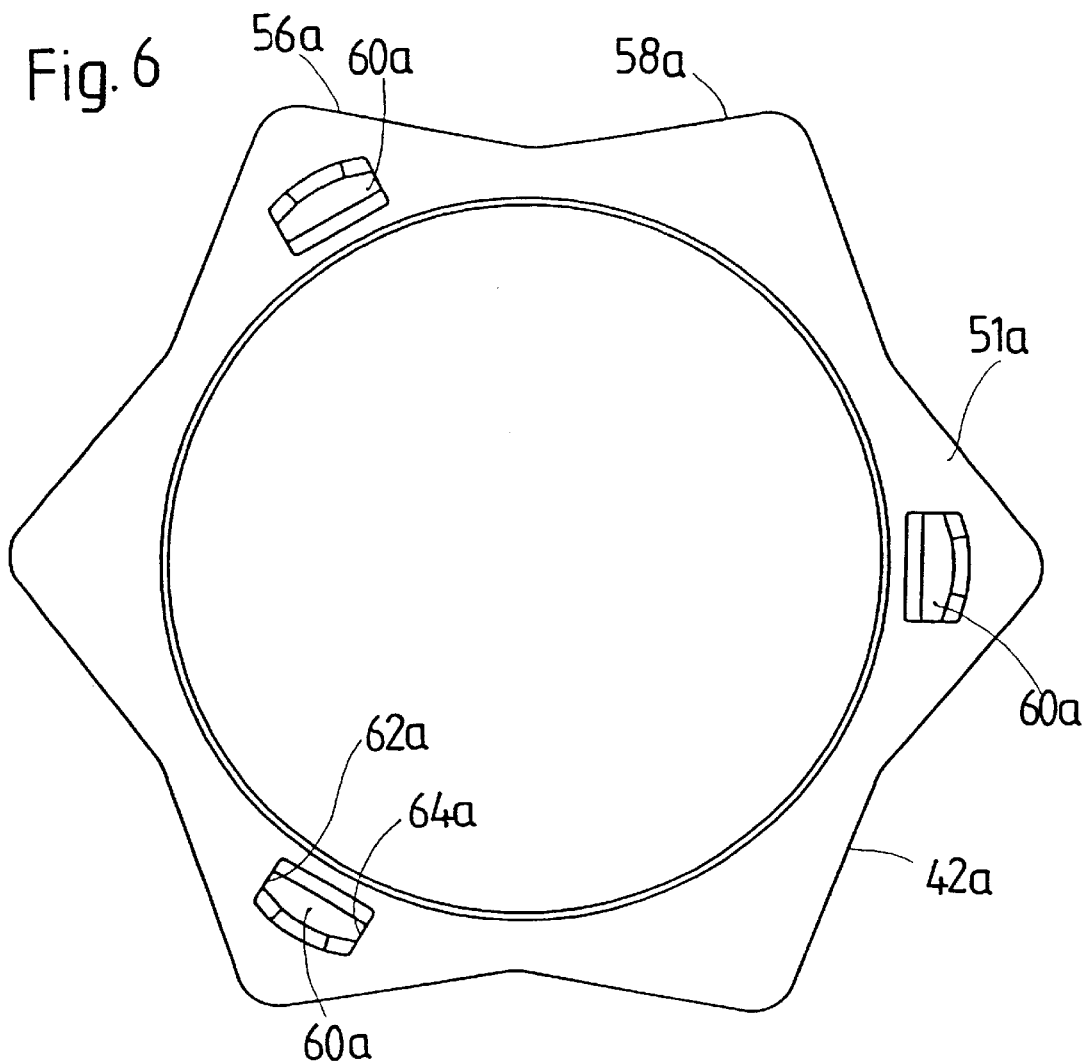
FIG. 6 is an axial view of an alternative embodiment form of a braking arrangement.
Figure 7:
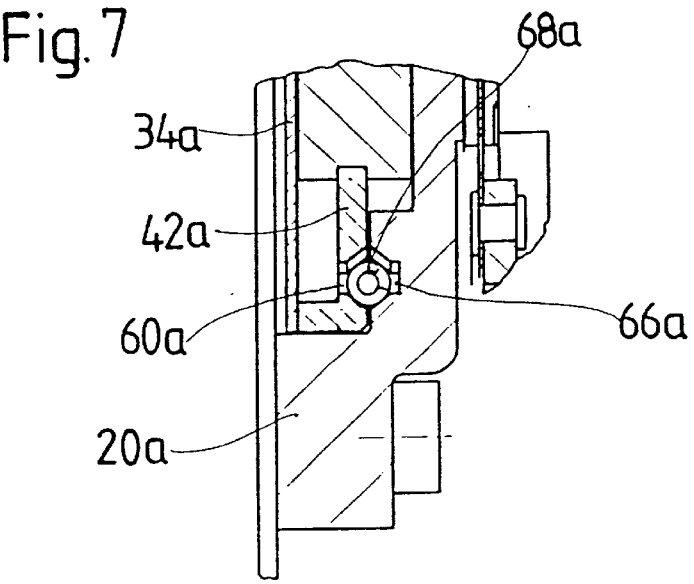
FIG. 7 is a partial longitudinal sectional view of a vibration damping device with the braking arrangement of FIG. 6.

FIGS. 6 and 7 show an alternative embodiment of a stop ring 42a in which a majority of the movement energy taken away from the individual deflection masses when braking is stored in potential energy and may then be given back to the system. Components which correspond to components described above are designated by the same reference number with a suffix "a" appended thereto.

The stop ring 42a has spring windows 60a in at least some of its wedges or tips 51a. The base body 20a has a spring receiving depression 66a associated with every spring window 60a. When the stop ring 42a is positioned between the base body 20a and the cover plate 34a, a receiving volume is formed by the laterally widening spring windows 60a and depressions 66a in which at least one spring such, for example, as a helical pressure spring 68a may be positioned. Each helical spring 68a is preferably supported with a pretensioning at respective control edges 62a, 64a of the spring windows 60a or depressions 66a. This results again in a configuration in which the stop ring 42a is rotatable in the circumferential direction. In this case, the stop ring 42a is rotatable against the action of the springs 68a. A deflection of the stop ring 42a as was described in the preceding with reference to FIG. 5 accordingly results in that the stop ring 42a is compulsorily restored to the neutral position, shown by thin dashed lines in FIG. 5, when the movement of the individual deflection masses 26a is reversed by the springs 68a. The energy stored in the springs 68a is again converted at least partly into movement energy of the deflection masses 26.

Friction may again be generated by the clamping of the stop ring 42a between the cover plate 34a and the base body 20a. A pretensioning spring such as the dish spring 53 described above and disclosed in FIG. 4 may be arranged between the base body 20a and the stop ring 42a.

Figure 8:
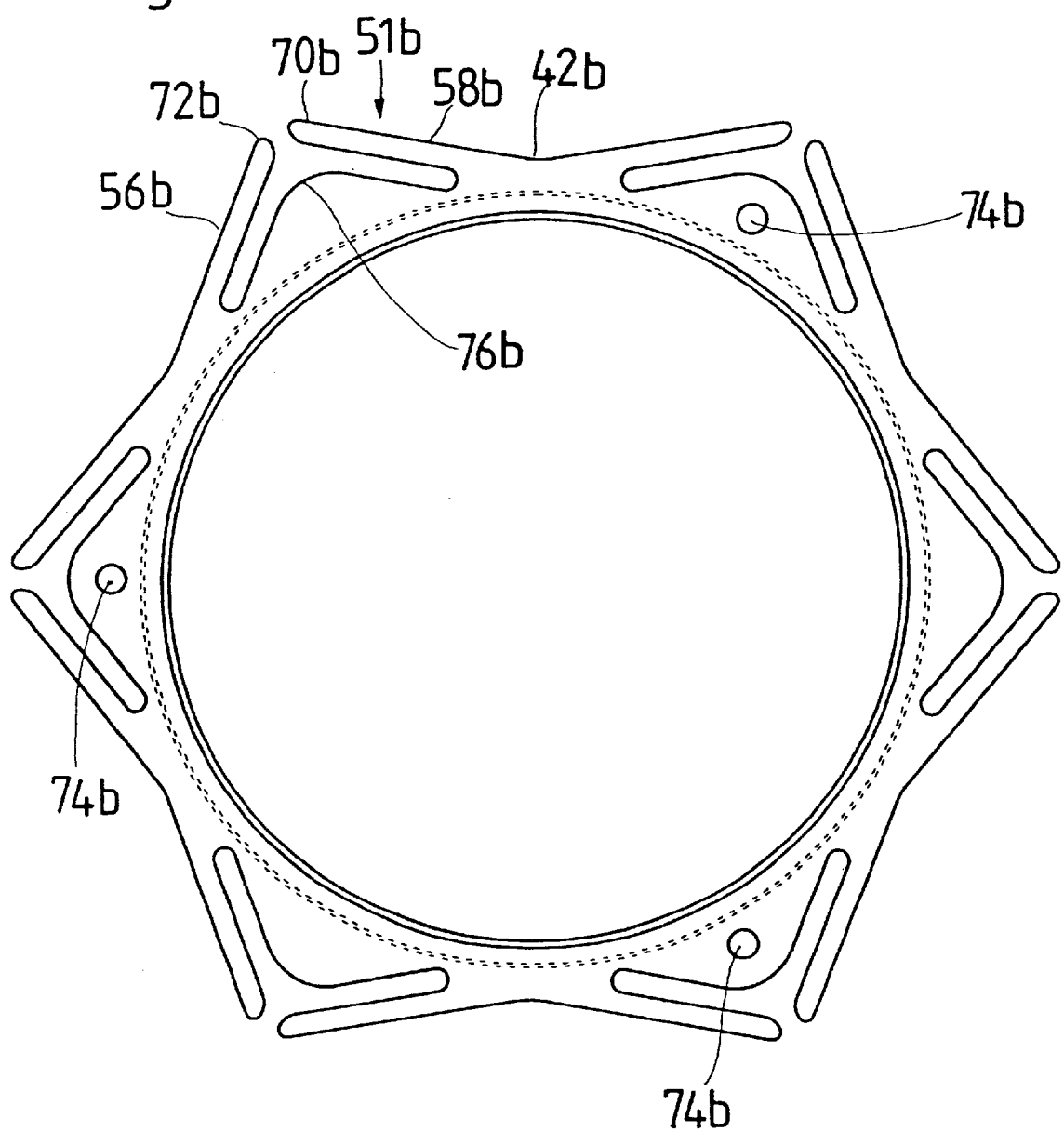
FIG. 8 is an axial view showing an alternative embodiment of a braking arrangement according to the present invention.

A further embodiment of the present invention is disclosed with reference to FIG. 8. Components which correspond to components described above are designated by the same reference number with a suffix "b" appended thereto. The stop ring 42b in FIG. 8 is arranged such that stop areas 58a and 56b are formed on approximately tangentially projecting stop webs 70b, 72b in the area of the individual wedges or tips 51b. The webs 70b, 72b are separated from each other by a slight distance in the area of their free ends. A stop ring 42b of this kind may be produced, for example, from an elastic material such as plastic, spring steel, or any material with similar elastic characteristics. The stop ring 42b further has a plurality of fastening openings 74b. Fastening pins or rivets may be arranged though the fastening openings 74b for connecting the stop ring 42b at the base body (not shown in FIG. 8) so the stop ring 42b is fixed with respect to rotation relative to the base body. When the respective deflection masses (not shown in FIG. 8) reach their path end area, they abut at the stop webs 70b, 72b. In response, the stop webs 70b, 72b deform and gradually brake the movement of the deflection masses. An overload protection for the stop webs 70b, 72b may be arranged on the stop ring 42b in the form of a reinforcement portion 76b. The reinforcement portion 76b is located under every stop web 70b, 72b and the respective stop web 70b or 72b abut the reinforcement portion 76b in the event of an excessive deflection. The reinforcement portion 76b is arranged so that it stops deformation of the stop webs 70b, 72 before damage is caused by cracking or plastic deformation. The movement energy is first stored intermediately in deformation energy of the respective stop webs 70b, 72b and at least partly transferred again to the deflection masses during the return movement. It is noted that the individual stop webs 70b, 72b are not necessarily formed integral with the stop ring 42b. The stop webs 70b, 72b may be formed from separate structural component parts and fastened such, for example, as by riveting or soldering to the main body of the stop ring 42b.

It is further noted that for all of the above embodiments, the shock occurring when the deflection masses contact the stop areas of the stop ring may be reduced by deliberate shaping of the respective stop areas at the stop ring in that the angle at which the deflection masses strike these areas is kept as small as possible, i.e., a tangential advancing movement toward these areas is preferably achieved. This configuration may be achieved by a corresponding inclination of the stop areas with respect to the anticipated movement path of the deflection masses.

Figure 9:
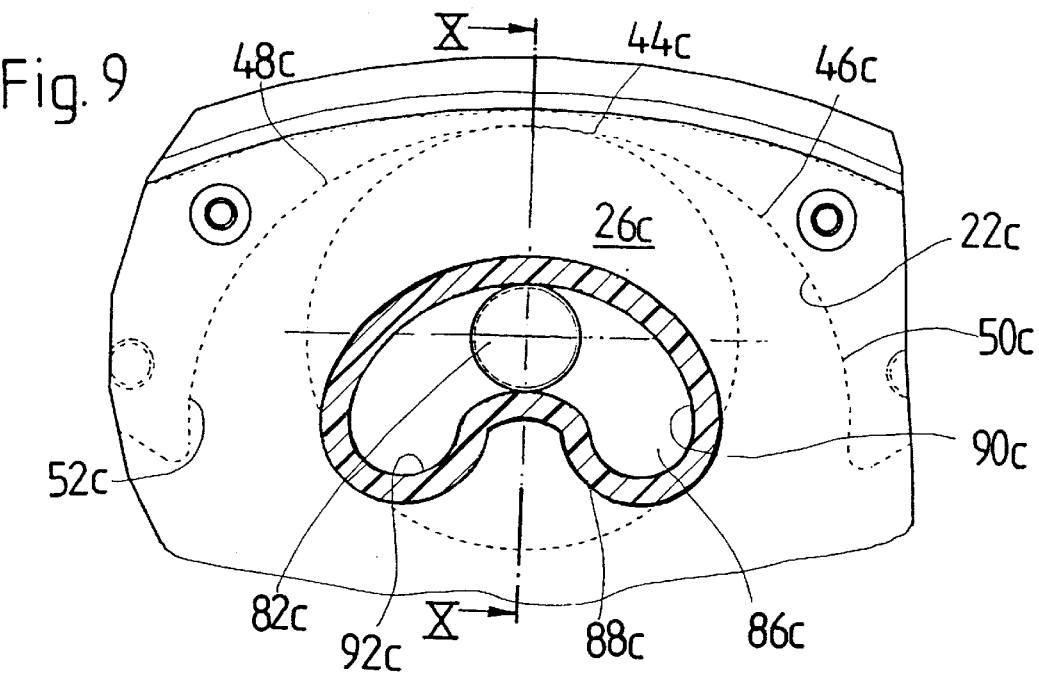
FIG. 9 is a schematic axial view of an alternative embodiment form of the vibration damping device according to the present invention.
Figure 10:
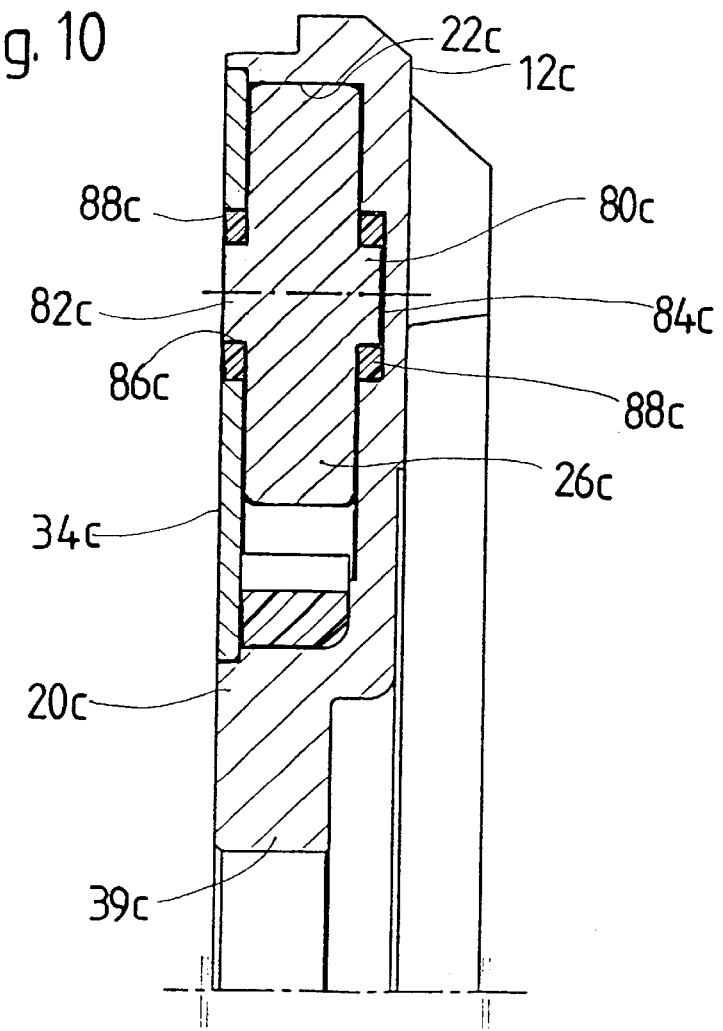
FIG. 10 is a sectional view along a line X—X in FIG. 9.

Another alternative embodiment form of a vibration damper according to the present invention is shown in FIGS. 9 and 10. Components which correspond to components described above with respect to construction and function are designated by the same reference number with a suffix "c" appended thereto.

In the embodiment of FIGS. 9 and 10, the deflection masses 26c comprise guide pins or projections 80c, 82c projecting out of both axial sides of the deflection masses 26c. These guide pins 80c, 82c engage in guide paths 84c, 86c formed in the base body 20c and in the cover plate 34c, respectively. These guide paths 84c, 86c comprise elongated openings or depressions whose curvature shape is adapted to the curvature shape of the individual deflection paths 22c. Accordingly, the individual deflection masses 26c continue to move along their deflection paths 22c and are supported at these deflection paths 22c. The guide pins 80c, 82c move in the respective guide paths 84c, 86c with a slight amount of movement play during the movement along the deflection path 22c. The guide paths 84c, 86c are formed or limited by an elastic material 88c (e.g., rubber border) which extends along the circumferential edges of the recesses or depressions 84c, 86c. When a respective deflection mass 26c approaches the end areas 50c, 52c of the deflection path 22c, the pins 80c, 82c also move toward respective end areas 90c, 92c of the guide paths 84c, 86c. Given a sufficiently large deflection of the deflection masses 26c, each of the guide pins 80c, 82c abuts at the elastic material 88c in the respective end areas 90c and 92c and brakes the movement of the deflection body 26c. The elastic deformation of the individual guide paths, i.e., of the elastic material 88c surrounding or forming the paths, ensures that a gradual braking of the deflection masses 26c is achieved, thereby preventing shocks and suppressing vibrational excitation. This solution also reduces the tendency to rattle because an elastic stop is possible at all times in every movement state due to the slight movement play of the guide pins 80c, 82c in the associated guide paths 84c, 86c.

It is noted that a configuration with only one individual guide pin and guide path is possible, for example, in the area of the base body 20c. However, for the sake of uniform loading, the embodiment described above is preferred. Further, it is noted that in the embodiment shown in FIGS. 9 and 10, the stop ring (42, 42a, 42b), as discussed above, may be eliminated. Further, the guide pins 80c, 82c may also be constructed in an elastic manner as an alternative to or in addition to the elastic construction in the area of the guide paths 84c, 86c. This can be carried out, for example, in that elastically deformable sleeves are arranged at an outer circumferential surface of the guide pins or in that the guide pin or guide pins is or are formed entirely of elastically deformable material.

Yet another embodiment of a vibration damper according to the invention is shown in FIG. 11. Components which correspond to components described above are designated by the same reference number with a suffix "d" appended thereto.

The base body 20d in FIG. 11 comprises material inserts 90d arranged at the end areas 52d, 50d of the respective deflection paths 22d. These material inserts 90d may be formed with increased elasticity with respect to the material of the base body 20d which otherwise forms the deflection paths 22d. For example, the material inserts 90d may comprise elastic plastic. When the deflection masses 26d then move toward the end areas 50d, 52d, they pass from the otherwise relatively hard deflection paths 22d into the elastic area of the material inserts 90d. Due to the elasticity of the material inserts 90d and the deformation of the inserts 90d generated by the rolling of the deflection masses 26d, movement energy is again converted into deformation energy and the movement of the deflection masses 26d is accordingly braked. A change in the surface region may also be arranged instead of or in addition to the changed elasticity, so that an increased rolling resistance is generated for the deflection masses 26d in the area of the inserts 90d. Instead of providing individual inserts, this rolling resistance may also be generated in that the path portion formed by the material of the base body 20d is subjected to a surface treatment in the end regions 50d, 52d.

A stop ring 42d with stop areas 56d, 58d is arranged for the respective deflection masses 26d in this embodiment. This stop ring 42d has a somewhat altered outer circumferential contour compared to the previously disclosed stop rings and may again be constructed, for example, in the manner described above with reference to FIGS. 4 to 8.

The preceding description was concerned with embodiment forms of a vibration damper in which rotational irregularities occurring due to movement of individual deflection masses in a rotating system, especially oscillation excitations originating from the region of a drive unit, are reduced by a built up counter-vibration. For the individual oscillation bodies, steps are undertaken in the area of the ends of their movement paths extending in the circumferential direction around an axis of rotation in order to achieve a smooth braking of the movement. The movement energy is dissipated either in deformation energy or in friction energy or is stored temporarily and then returned to the individual oscillation bodies. On the one hand, an abrupt and relatively sharp knocking with loud noises is prevented by the elastic braking of the oscillation bodies. On the other hand, the vibrational excitation of the system generated by the braking of the body is damped as far as possible.

The invention is not limited by the embodiments described above which are presented as examples only but can be modified in various ways within the scope of protection defined by the appended patent claims.

We claim:

1. A vibration damping device for a motor vehicle drive system, comprising:

a base body arranged for rotating about an axis of rotation; and a deflection mass arrangement arranged in said base body and having a plurality of deflection masses and corresponding deflection paths, said deflection masses being arranged for moving freely along said deflection paths during rotation of said base body about said axis of rotation, wherein each of said deflection paths has a vertex area and deflection areas on opposing sides of the vertex area, the deflection areas extending from the vertex area to respective end areas and having a decreasing distance to said axis of rotation proceeding from the vertex area to said end areas, and wherein said deflection mass arrangement further comprises a braking arrangement operatively arranged for gradually slowing an approach of each said deflection mass toward said end areas of said deflection path, said braking device comprising a stop ring arranged concentrically on said base body and having a plurality of wedges with radial outward extending tips, said plural wedges forming a star-shaped outer contour of said stop ring, each of said plural wedges comprising first and second stop areas arranged on opposing sides of said tip.

2. The vibration damping device of claim 1, wherein said first stop area of one of said plural wedges acts on a first one of said plural deflection masses and said second stop area of said one of said plural wedges acts on a second one of said plural deflection masses.

3. The vibration damping device of claim 2, wherein said second one of said plural deflection masses being adjacent to said first one of said plural deflection masses in a circumferential direction.

4. The vibration damping device of claim 1, wherein said stop ring is arranged for rotating relative to said base body.

5. The vibration damping device of claim 4, further comprising a plate spring for urging said stop ring against said base body and thereby creating a friction force between said stop ring and said base body during relative rotation therebetween.

6. The vibration damping device of claim 4, wherein each of said plural deflecting masses is arranged for contacting one of said first and second stop areas at a point of contact before reaching one of said end areas of an associated one of said deflection paths.

7. The vibration damping device of claim 4, wherein each of said plural deflecting masses is arranged for urging a relative rotation of said stop ring and said base body as said deflection mass moves from said point of contact to said one of said end areas.

* * * * *